United States Patent
Moreira et al.

(10) Patent No.: US 8,479,482 B2
(45) Date of Patent: Jul. 9, 2013

(54) DISPOSITIONS INTRODUCED TO ROTATING SHAFT, IMPACT ROD HARVESTER

(75) Inventors: Rogerio Cruz Moreira, Paraná (BR); Cezar De Mello Mesquita, Paraná (BR)

(73) Assignees: Empresa Basileira de Pesquisa Agropecuaria—Embrapa, Brasilia (BR); Rota Industria Ltda., Parana (BR)

( * ) Notice: Subject to any disclaimer, the term of this patent is extended or adjusted under 35 U.S.C. 154(b) by 194 days.

(21) Appl. No.: 12/159,863

(22) PCT Filed: Jan. 2, 2007

(86) PCT No.: PCT/BR2007/000002
§ 371 (c)(1),
(2), (4) Date: Feb. 26, 2009

(87) PCT Pub. No.: WO2007/076587
PCT Pub. Date: Jul. 12, 2007

(65) Prior Publication Data
US 2009/0293440 A1    Dec. 3, 2009

(30) Foreign Application Priority Data
Jan. 2, 2006  (BR) .................................. 8600964 U

(51) Int. Cl.
*A01D 34/00*  (2006.01)
(52) U.S. Cl.
USPC .......................................................... 56/14.6

(58) Field of Classification Search
USPC ............. 56/14.6, 33, 327.1, DIG. 9; 460/115, 460/135, 123, 59, 142; 15/182, 181
See application file for complete search history.

(56) References Cited

U.S. PATENT DOCUMENTS

| | | | | |
|---|---|---|---|---|
| 1,574,530 A | * | 2/1926 | Adams | 15/181 |
| 1,800,376 A | * | 4/1931 | Cornell | 15/181 |
| 2,167,949 A | * | 8/1939 | Herold | 15/181 |
| 2,172,433 A | * | 9/1939 | Churchill | 300/21 |
| 2,324,272 A | * | 7/1943 | Anderson | 15/179 |
| 2,349,643 A | * | 5/1944 | Wesemeyer | 15/182 |
| 2,409,309 A | * | 10/1946 | Peterson | 15/181 |
| 2,418,575 A | * | 4/1947 | Christiansen | 171/36 |
| 2,571,224 A | * | 10/1951 | Edwards | 56/13.5 |
| 2,641,888 A | * | 6/1953 | Grether | 56/13.5 |
| 2,673,440 A | * | 3/1954 | Sawyer et al. | 56/33 |
| 2,782,439 A | * | 2/1957 | Ballard | 15/182 |
| 2,817,108 A | * | 12/1957 | Van Clief, Jr. | 15/182 |
| 2,825,195 A | * | 3/1958 | Smith | 56/13.5 |
| 2,856,624 A | * | 10/1958 | Cook, Jr. et al. | 15/181 |
| 2,903,729 A | * | 9/1959 | Manberg | 15/182 |
| 2,932,051 A | * | 4/1960 | Mertes | 15/182 |

(Continued)

FOREIGN PATENT DOCUMENTS

DE    20007014 U1 *  8/2000
GB    2397563 A  *  7/2004

*Primary Examiner* — Árpád Fábián-Kovács
(74) *Attorney, Agent, or Firm* — Sughrue Mion, PLLC

(57) ABSTRACT

Provided is a harvesting module including twin parallel rotating shafts. The rotating shafts each have impact rods that are configured to rotation in opposite directions. The shafts are sloped so that one end of the shafts is closer to the ground than another end of the shafts. The rods are fixed to the shafts in a spiral formation using a series of self locking rings fitted over the shafts.

9 Claims, 16 Drawing Sheets

U.S. PATENT DOCUMENTS

| | | | | |
|---|---|---|---|---|
| 3,087,599 A * | 4/1963 | Nelson | | 198/780 |
| 3,200,430 A * | 8/1965 | Haracz | | 15/183 |
| 3,233,272 A * | 2/1966 | Pambello | | 15/182 |
| 3,253,291 A * | 5/1966 | Nelson | | 15/181 |
| 3,483,686 A * | 12/1969 | Long et al. | | 56/35 |
| 3,508,387 A * | 4/1970 | Wright | | 56/95 |
| 3,589,114 A * | 6/1971 | Gillette | | 56/33 |
| 3,688,335 A * | 9/1972 | Clark | | 15/182 |
| 3,750,225 A * | 8/1973 | Gould et al. | | 15/182 |
| 3,851,350 A * | 12/1974 | Schofield | | 15/181 |
| 3,855,659 A * | 12/1974 | Grambor | | 15/181 |
| 3,900,915 A * | 8/1975 | Rosseau | | 15/182 |
| 3,952,359 A * | 4/1976 | Rosseau | | 15/182 |
| 3,968,536 A * | 7/1976 | Leighton et al. | | 15/187 |
| 4,077,193 A * | 3/1978 | Diggs | | 56/328.1 |
| 4,306,402 A * | 12/1981 | Whimp | | 56/7 |
| 4,338,770 A * | 7/1982 | Schlueter | | 56/33 |
| 4,341,062 A * | 7/1982 | Scudder | | 56/330 |
| 4,402,175 A * | 9/1983 | Watenpaugh | | 56/327.1 |
| 4,490,877 A * | 1/1985 | Drumm | | 15/182 |
| 4,637,173 A * | 1/1987 | Hundebol | | 451/466 |
| 4,677,813 A * | 7/1987 | Stiff et al. | | 56/13.9 |
| 5,076,046 A * | 12/1991 | Schilling | | 56/327.1 |
| 5,109,976 A * | 5/1992 | Mohri et al. | | 198/498 |
| 5,816,036 A * | 10/1998 | Caillouet | | 56/63 |
| 6,062,009 A * | 5/2000 | Caillouet | | 56/12.8 |
| 6,260,927 B1 * | 7/2001 | Sajakorpi et al. | | 300/21 |
| 7,516,603 B2 * | 4/2009 | Bennett | | 56/33 |
| 2002/0004418 A1 | 1/2002 | Mesquita et al. | | |
| 2002/0189043 A1 * | 12/2002 | Dondi et al. | | 15/181 |
| 2004/0148917 A1 * | 8/2004 | Eastwood | | 56/6 |
| 2005/0081316 A1 * | 4/2005 | Dondi et al. | | 15/179 |
| 2008/0034523 A1 * | 2/2008 | Chen | | 15/182 |
| 2008/0053671 A1 * | 3/2008 | Buckrell et al. | | 172/21 |

* cited by examiner

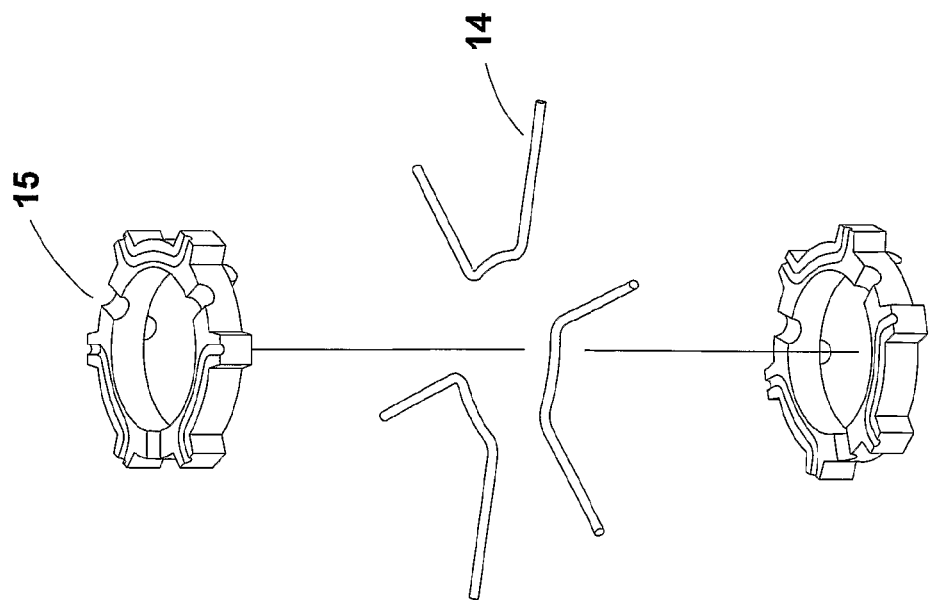
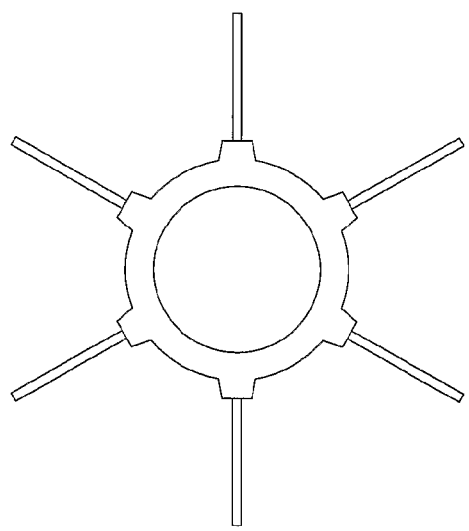
Fig. 5

DISPOSITIONS INTRODUCED TO ROTATING SHAFT, IMPACT ROD HARVESTER

FIELD OF USE

The utility model relates to a grain harvester for soybeans and beans, among others, having significant technological improvements that provide greater capability and efficiency in harvesting grain to the system based on two rotating shafts with impact rods, characterized by BR MU 7802681-4 and equivalent US 2002/0004418. Furthermore, other technical results were attained, such as, for example, the successful harvest of soybean pods.

BACKGROUND OF THE UTILITY MODEL

Commercially available harvesters retain all the original functions of the first model used to harvest soybeans over 70 years ago (QUICK & BUCHELE, 1978—*The Grain Harvesters*. St. Joseph. Mich.: ASAE), namely, they cut, collect, transport and thresh the entire plant, separate the grains from the straw, clean and convey the grain to the grain reservoirs. Of these functions, the threshing, which is the system of the harvesters that requires the most energy (KANAFOJSKI & KARWOWSKI, 1976—*Agricultural Machines, Theory and Construction*, Vol. 2. Springfield, Va.: Foreign Scientific Publications. Warsaw, Poland: Department of the National Center for Scientific Technical and Economic Information. Washington, D.C.: U.S. Department of Commerce, National Technical Information Service) and (HURSMAN, 1983—Optimum cereal harvester operation by means of automatic machine and threshing speed control. PhD diss. Wageningen, The Netherlands: Wageningen University, Department of Agricultural Engineering), mostly uses the tangentially fed bar cylinder and concave system, patented over 200 years ago, and the axial threshing system, patented over 100 years ago. Both systems increase the potential of high levels of mechanical damage to the seeds. Paradoxically, research by HOAG (1972—Properties related to soybeans shatter. *Trans. ASAE* 15(3): 494-497), QUICK (1974—A quantitative shatter index for soybeans. *Experimental Agric.* 10(10): 149-158) and MESQUITA (1989—Mechanics of soybean threshing. PhD diss. Lincoln, Neb.: University of Nebraska-Lincoln, Department of Agricultural Engineering) indicated little energy demand for threshing soybean pods. This apparent contradiction was explained by MESQUITA (1989), when concluding that the energy requirement for threshing the entire plant (stalk and pod) was approximately ten times less than that required for merely threshing soybean pods.

On the other hand, if the number of parts of a harvester, and the amount of MOG (Material Other than Grain) processed, are reduced, it is probable that the durability and reliability of the harvester will increase, as well as the quality of the product. Furthermore, this would also lead to a reduction of the required energy input, the size of the harvester and operational costs. According to WOOD (1977—Reliability growth. In *Proc. International Grain and Forage Harvesting Conf.*, 144-145. St. Joseph, Mich.: ASAE) reliability is achieved both by simplification and improvement. He adds that machines built with fewer active parts have greater chances of achieving greater reliability. Based on this premise, new models of harvesters and accessories, having a substantial reduction in the number of moving parts and MOG processing, have been commercially marketed in Europe (VINCENT & MOWITZ, 1987—Farm ideas form around the world. *Successful Farming, Des Moines* 85(6): 14-17) and (KLINNER et al., 1987—A new concept in combine harvester header. *J. Agric. Eng. Res., London* 38(1): 37-45). Following this trend, revolutionary prototypes, with 55% less moving parts compared to a conventional harvester, have been developed in the US (RITCHIE, 1995—Mark Underwood's dream machine. *Soybean Digest*, Hudson 55(6): 8-9). In the same line of research, MESQUITA & HANNA (1993a—Soybean threshing mechanics: I. Frictional rubbing by flat belts. *Trans. ASAE* 36(2): 275-279; 1993b—Soybean threshing mechanics: II. Impact. *Trans. ASAE* 36(2): 281-284; 1996—Soybean threshing devices. *Applied Eng. in Agric.* 12(1): 15-19) and MESQUITA et al. (1997—Blast wheel device for threshing soybeans. *Trans. ASAE* 40(3): 541-546) have studied the mechanics of soybean threshing based on non-conventional threshing elements or mechanisms and the concept of not extracting the plant in the field. These authors developed experimental equipment to analyze mechanical action by frictional rubbing and by impact of the soybean plants and obtained a threshing efficiency superior to 93% with frictional rubbing, and over 92% and 97% in threshing through impact by moving metal surfaces and by free plastic particles, respectively.

Among the non-conventional elements researched in the problematic harvest of soybeans, air pressure has been the object of several studies. However, in most of this research, it is employed as an auxiliary element, in complement to the main work by mechanical component (NAVE et al., 1972—Combine headers for soybeans. Transactions of the ASAE, 15(4): 632-635; TATE e NAVE, 1973—Air-conveyor header for soybean harvesting. Transactions of the ASAE, 16(1): 37-39; TUNNEL et al., 1973—Reducing soybean header losses with air. Transactions of the ASAE, 16(6): 1020-1023; WAIT et al., 1974—Reducing soybean cutterbar losses with low-pressure airjets. Transactions of the ASAE, 17(5): 817-820; e FAYZ & HANNA, 1979—A pneumatic conveying system for reducing soybean header losses. Transactions of the ASAE, 22(5): 962-964). However, there are no known cases of air being used as the unique element for performing multiple main functions, such as the collection of grains and straw, separation of the grains from the straw, cleaning and transport.

The following brief account of the culture of green soybeans serves to describe a further problem that the new dispositions object of the present utility model solve efficiently, namely, the harvest of green soybeans.

Edamame or green soybean or vegetable soybean is a special type of soybean broadly consumed in Japan, Taiwan, China and Korea, whose importance for human nutrition is rapidly being acknowledged in Western countries as being one of the most healthy foods for the next decades. Originating in eastern Asia, this slightly sweet tasty vegetable has great nutritional value and can be eaten as a starter or as main dish, prepared in many ways. Usually, only the seeds are eaten, and they can be removed from their pods before cooking but, also, the whole pod can be boiled in lightly salted water, so as to facilitate the removal of the seeds. An important food in the Asian diet for centuries, green soybean is one of the most protein rich vegetable cultures, used in China as food and medicine for around 4000 to 5000 years (NGUYEN, 1998—The New Rural Industries. Ed.: K. W. Hyde. Canberra, Rural Industries Research and Development Corporation: 196-203. http://www.rirdc.gov.au/pub/handbook/edamane.html, accessed on Oct. 7, 2001). Practices adopted for the culture of green soybeans are the same for soybeans, except that the green pods are harvested during their green stage, when the pods are almost completely filled by the fully developed grains. According to the Extension Service of WASHINGTON STATE UNIVERSITY (2001—On-farm research: edamane (vegetable soybean) variety trials. Cooperative Extension, WSU, Vancouver Research & Extension Unit. http://agsyst.wsu.edu/edamresearch.html, accessed on Oct. 3, 2001), the consumption of green soybeans in the United States is rapidly rising due to the growth of the Asian-American population as well as the increasing popularity of Oriental restaurants and cooking. For this reason, the extension service of the WSU has worked for five years in cooperation with the Washington State producers so as to select the better varieties for the region as well as those that provide high potential market value.

The high nutritional value of green soybeans, together with high market prices, has promoted a substantial increase in demand and, consequently, farming during this decade, including in countries which are traditional soybean producers (but not of green soybeans), such as the US (major world producer of regular soybeans) and Argentina (main competitor of Brazil, after the US). According to LUMPKIN et al. (1993—Potential new specialty crops from Asia: Azuki bean, edamame soybean, and astragalus. New crops. John Wiley and Sons, Inc., New York, p. 45-51. http://www.ahs.cqu.edu.au/info/science/psg/AsianVeg/Edamame.html, accessed on Oct. 6, 2001), US production is still very reduced, considering the growth in demand and the considerable volume of research of the last 50 years. Unfortunately, Brazil has no commercial green soybean crops and the reduced research is still incipient and limited to genetic improvement, especially at Embrapa Soja (unit of Embrapa—Brazilian Agricultural Research Company), which seeks to achieve size standards for the pods, as well as the nutritional qualities characteristic of the edamame produced in Asian countries. On the other hand, considering Brazil is the second world producer of soybeans and the huge potential market for green soybeans—which is in expansion—, it is believed that the development of this culture is of strategic and social-economic importance, especially for the small and medium sized producers, due to significantly increased production an, mainly, the increase in crop value. According to SHANMUGASUNDARAM et al., (1998—Vegetable soybean for sustainable agriculture. Agric. Improv. Station, Taichung, Special Publication, p. 379-385), the price of the soybeans is US $0.60/Kg, which corresponded to a gross return of US $1,200.00 for a productivity of 2,000 Kg/ha and a production cost of US $1,696.00, which represents losses of US $496.00/ha. However, even with the reduced price of the vegetable soybean pods at US $0.32/Kg, but with an average production of 8,000 Kg/ha, the gross return was US $2,560.00/ha, or a net return of US $884.00/ha. Thus, the gradual decline in the cultivated area of grain soybean over the last years in Taiwan is not surprising, while the cultivated area of vegetable soybean has been increasing gradually by around 10,000 ha during the decade. In an incisive way, the net gain is considerably larger when cultivating green soybean rather then cultivating regular soybean. Thus, green soybean culture is extremely attractive for farmers. Furthermore, SHANMUGASUNDARAM et al. (1989—Vegetable soybeans in the East. In: World Soybean Research Conference IV, Buenos Aires. Proceedings, vol. 4, p. 1979-1986) highlight that, although frozen vegetable soybean consumption is more popular in Japan and Taiwan, there is great potential for vegetable soybean consumption in all developing countries and mainly the poorer countries of Asia and Africa. This could considerably reduce malnutrition related to the low consumption of protein, vitamins and minerals.

While the seeds play a fundamental role in the nutrition of human beings, the residues in the form of stalks with leaves and roots (9 to 15 tons/ha) and empty pods (4.6 to 6.7 tons/ha) are also rich for animal feed or even for the soil, as an organic fertilizer.

Green soybean is harvested after the R6 and before the R7 growing stages (FEHR et al., 1971—Stages of development descriptions for soybeans, *Glycine max* (L.) Merril. Crop Sci. 11:929-931), while the pod is still green and the seeds are developed in a manner that they fill 80 to 90% of the pod's width (SHANMUGASUNDARAM et al., 1991—Varietal improvement of vegetable soybean in Taiwan. In: Vegetable Soybean Research needs for production and quality improvement: proceedings of a workshop held at Kenting, Taiwan, Apr. 29-May 2, 1991. Asian Vegetable Research and Development Center, Publication N°. 91-346, p. 30-42).

According to SHANMUGASUNDARAM et al. (1998), among the main objectives of the AVRDC (Asian Vegetable Research and Development Center) research programs for vegetable soybeans are developments for adapting the culture to mechanized operations, especially harvesting. During the studies performed up to the present moment, it was estimated that around 76% of the total vegetable soybean biomass is returned to the soil as manure or as animal feed, or is used in both ways. The other 24% of the biomass, composed exclusively by seeds, are used for human nutrition. According to SHANMUGASUNDARAM et al., (1998), as mechanic harvest is probably the major limiting factor of this culture, pod harvesting machines are being experimented. This mechanical harvest intended entirely for pods ensures that all remaining residues of the vegetal soybean plants return to the soil.

The major limiting factor for large scale commercial production, mechanical harvesting has mainly been characterized by the low efficiency of the harvesters used for pod picking. Usually, green soybean should be harvested within 68 to 86 days after seeding, depending on the cultivars and the date of seeding, when around 90% of the pods reach their complete fullness and present a distinctive green color. Green soybean can be harvested three days earlier or later, but, however, the pod productivity can be reduced by an approximately rate of 0.5 ton/ha/day of delay. Since there is no specific harvester for green soybeans as yet, the green bean harvester has provided good performance in green soybean harvesting, removing around 76% of the seeds and separating leaves and stalks. Thus, this harvester operation causes a loss of 24% of the seeds and also damages around 7% of the ones harvested (NGUYEN, 1998). The harvested area and time spent using a harvester for one row of plants is approximately 0.25 ha/hour.

In the Far East, the green pods are usually hand harvested, which is inadequate for the harvesting and processing of green soybean on a commercial scale. According to the INTSOY (1987—INTSOY research focuses on green soybeans as commercial frozen vegetable. International Soybeans Program, Urbana, Newsletter n°. 37, October 1987), the main obstacles to the development of green soybean as a commercial product of major importance are the harvesting problems and the split pods during this operation. While seeking solutions for this problem, the institution adapted and used a self-propelled harvester originally made for harvesting green beans, and concluded that this machine could be used for harvesting green soybean, although adaptations and improvements are necessary. In Taiwan, one of the main producers of vegetable soybean, a harvester is used (FMC), originally intended for harvesting runner beans.

BR MU 7802681-4 (1998) reveals the general concept of the harvester of the present utility model. During the following years, the system continued to be developed by Embrapa Soja and Rota Indústria de Máquinas Agrícolas LTDA.

In 2003, the Revista da Sociedade Brasileira de Engenharia Agrícola (Mesquita et al., 2003—Desenvolvimento de protótipo de concepção inovadora de colhedora de soja. *Eng. Agric., Jaboticabal* 23(1): 129-140) published a study for a harvester with certain technical advances. This prototype has a threshing system of plastic rods where the plants do not need to be cut or extracted from the soil, thus processing a minimum of MOG and a pneumatic system for culling, transporting and separating the grains from the MOG as well as storing the grains. This work evaluated the threshing efficiency and the quantity of MOG remaining on the plant with the new configuration of the plastic impact rods and the first field trials of the pneumatic system for culling, separating, cleaning and transporting the grains. The MOG contained in the samples was compared and quantified, together with the shatter levels of the tegmen, invisible mechanical damage and the physiological quality of the grains harvested, when compared to hand picking and conventional harvesting.

Substantial new dispositions were introduced to this model published in 2003, so the harvester is now technologically ready for use in production.

The 2003 prototype is built in a modular manner for harvesting a single row of soybeans. Initially designed to be coupled to the three-point hitch of a tractor's hydraulic system and driven from its power take-off shaft, the equipment is basically composed of a thresher mechanism which, in accordance with BR MU 7802681-4, threshes the grains directly from the plants in the fields, without cutting or extracting them from the soil, for subsequent collection and processing of the grains. In order to perform this operation, the prototype threshing mechanism was located in a compartment or chamber and used the energy of the impact transmitted to the soybean pods by semi-flexible plastic rods fixed to parallel shafts rotating in opposite directions. This movement causes a sweeping impact of the pods, in an upward movement and to both sides of the plant row which are guided to pass between the shafts while the prototype moved over the crop. The plastic rods are 40 mm long by 3 mm in diameter and are produced by injection as parts comprising three rods disposed symmetrically and radially around a ring having an external diameter of 60 mm and a width of 10 mm further having recessions and projections on its sides. These recessions and projections allow mating the rings when mounting them along the rotating shafts thus forming a sequence of impact rods in a twin spiral configuration. With the rotation of the shafts, these spirals move towards the rear of the prototype, which facilitates the passage of the plant rows when they pass between the said shafts. The present study assessed a different configuration for the impact rods whereby these are disposed tangentially to the rings, rather than in the radial position of the original configuration. It was foreseen that this new configuration would lead to the impact between rods and pods being concentrated to the outer half of the rods which would thus increase their durability, but this was not confirmed.

The shafts are made of steel and are 1500 mm long by 25 mm in diameter, with their centerlines being placed approximately 140 mm apart, and form an angle of 30° with the ground, in a slope descending from the drive pulley to the rear bearing wheel of the equipment. Each shaft is covered by approximately 15° rings totaling 450 plastic impact rods, whereby their ends are tangential the ends of their counterparts on the other shaft. The prototype moved at a speed of approximately 5 kmh$^{-1}$ and with the shafts turning at around 2600 rpm, this threshing system ensures that all pods are struck at least once by one of the rods.

The pneumatic system of the prototype only used air, through ducts, venturi effect injector valves and air flow regulator valves to perform the remaining operations, namely, separation of the chaff; capture of the grain by differential air pressure on entry by venturi effect injector valve; elevation of the grain by positive air pressure; cleaning of the grains by reduced positive air pressure, eliminating pieces of the pods captured together with the grains; and temporary storage of the grains by diverting the clean grain to the grain reservoir, by reducing the positive pressure and airflow speed generated within the elevation duct. This prototype does not perform the operations of gathering, cutting, transport of the plants at the cutting platform, transfer of the cutting platform to the threshing system, transport for rethreshing, transport to the grain reservoirs, elevation for rethreshing, elevation to the grain reservoir, transport for unloading, shredding the straw, and spreading the straw, which are performed by all conventional harvesters. The reduced number of components of each module allows coupling to the three-point hitch of regular tractors, as well as using the power take-off shaft to drive the twin shafts mounted with the impact rods of the threshing mechanism and the blower of the pneumatic system, which are the only moving components of the prototype.

This is the overall picture of the state of development up until 2003. Work continued and many improvements were achieved, which are scope of the present utility model:

Inversion of the angle of the threshing shafts: this proved a notable change in the concept that provided better results; the parallel shafts mounted with plastic rods now have their lower ends close to the ground towards the front, in relation to the direction of the harvester's movement, in a manner that the said shafts form an angle greater than 90° and less than 180° in relation to the ground, or, in other words, the action of the shafts occurs from bottom to top in relation to the plant.

The rings, that were formerly fitted with three rods (120° between each rod), are now fitted with six flexible cords (60° between each cord).

There is a new method for the mounting the flexible cords to the rings;

A pneumatic system was added for preventing the loss of grains;

An inertial chamber was added for the final separation of chaff;

Outlets for expelling chaff;

Lateral hitch to the tractor, where formerly this was directly to the tractor's three-point hitch, with a capacity for up to three thresher modules;

A light self-propelled harvester was developed equipped with thresher modules arrayed under the chassis;

Plant extractor prior to threshing by the twin shafts mounted with impact rods for cultures such as beans (*Phaseolus vulgaris* L.);

Separator system for grain pods;

Semicircular casing around the lower and final section of the shafts, to allow the plants to slide past, fitted to the system for harvesting rice and wheat with the descending thresher shaft system;

Semicircular casing around the shafts, at the entry of the machine protecting the stalks of the plants from the action of the flexible cords and thus only threshing the upper part of the plants, for harvesting rice and wheat with the ascending thresher shaft system;

Defoliant roller for harvesting green soybeans.

Thus, the harvester object of the present utility model presents a specific variation for harvesting green soybeans, furthermore, and has demonstrated a relatively good performance in harvesting the pods. The first component of this harvester to come into contact with the crop is a cylindrical bristle brush positioned transversally to the direction of movement having the purpose of stripping the greatest possible quantity of green leaves from the plant, which is the latest advance on the list of improvements, namely, defoliant roller for the harvest of green soybeans. This initial operation facilitates the subsequent removal of the green soybean pods, pulling them from leafless stalks.

Other researcher's attempts for harvesting green soybean, MILES & CHEN (2000—Edamame harvest trials. WSU Vancouver Research and Extension Unit, Vancouver, Report, 8p. http://www.agsyst.wsu.edu/EdamameReport2000.pdf, accessed on Oct. 16, 2001) proved the low efficiency of mechanical harvesting, as only 50% of the commercial crop in Washington State was harvested, despite using the cultivar which offered the greatest height level of pod growth in relation to the ground, one of the best characteristics for mechanical harvesting. Thus, they concluded that improvement in harvesters is fundamental for achieving greater harvest efficiency and for making the culture of edamame feasible on a commercial scale.

SUMMARY OF THE UTILITY MODEL

The present model is characterized by presenting a set of conceptions that reduce the mechanical damage to grains during harvest, as well as optimizing efficiency in terms of energy consumption and reducing loss of grain throughout the process, as well as facilitating the maintenance of the equipment. It was developed for the harvest of cultures such as soybeans (*Glycine max* L.), beans ((*Phaseoulus vulgaris* L.), rice (*Oryza sativa* L.) and wheat (*Triticum* spp. L.).

The harvest system is based on the principle of the direct harvest of grains of plants, and more exceptionally pods, without cutting, or even extraction.

In relation to dicotyledons, such as soybeans and beans, it operates in a configuration that presents: (a) two parallel rotating shafts (1) mounted with impact rods in a spirally ascendant manner and rotating opposed to each other; (b) with axes sloped in a manner that their foremost ends are closer to the ground than their rearmost ends; (c) grain transport and cleaning system comprising a blower (2) and air duct (12), located under the plan of the thresher shafts (1), grain and chaff conveyor duct (9) and inertial chamber (4); (d) optionally, pneumatic system for avoiding loss of grain with ascendant flow at the lower end of the two shafts (1); (e) optionally, defoliant system (FIG. 13) mounted to the front of the thresher module (27); and (f) optionally, conventional system for extracting plants mounted to the front of the thresher module (27), intended for harvesting beans.

When operating in the harvest of monocotyledons, such as wheat and rice, the configuration consists: (a) two parallel rotating shafts mounted with impact rods in a spirally descendant manner and rotating opposed to each other; (b) with axes sloped in a manner that the their foremost ends are further to the ground than their rearmost ends; (c) grain transport and cleaning system comprising a ventilator (2) and air duct (12), located under the plan of the thresher shafts (1), grain and chaff conveyor duct (9) and inertial chamber (4); (d) existence of a semi-circular metal casing along the second half of the shafts joined to the two air ducts (FIG. 12) for preventing contact of the stems of already threshed plants with the said shafts; and (e) optionally, a pneumatic system for avoiding loss of grain with ascendant flow at the lower extremity of the two shafts (1).

An improved system in terms of transmitting power to the machine, relating to the use of electric motors for driving the blowers or fans (2 and 3) as well as the two thresher shafts (1), which notably reduced the number of total items, mass, and therefore expense, as well as making maintenance easier. The source of energy comprises an electric generator (33) which, in the case of the implement (FIG. 14), is moved by the tractor's power take-off (24), by means of multiplier gear (34) to increase revs.

While the implement (FIG. 14), was designed to include from one to a maximum of three thresher modules (27) coupled to the regular farm tractor (24) by means of the lateral metal bar (25) equipped with articulations (26) at the points linking tractor to implement.

The conception of each rotating shaft (1) is innovating, and is characterized by being equipped with: internal cylinder; pairs of rings that fix rods inserted into said cylinder; end opposite the reduction box having easily removable end fittings to release the rings; and fixed rings related to the internal cylinder. These rings (15) present semi-circular recessions for mounting the rods on the sides of the said rings; and projections and locking slots to prevent the rotation of a ring in relation to the others.

Lastly, in view of the peculiar design of the threshing modules (27), a self-propelled harvester has been developed having entirely novel structural characteristics, characterized by being equipped with a set of harvester modules (27) arrayed under the chassis between its wheel axles, as seen in FIG. 11.

BRIEF DESCRIPTION OF THE FIGURES

FIG. 5: Example of a pair of rings, showing the recessions and projections intended for mounting the plastic rods, made of nylon, between each ring, as well as an upper view of a pair of assembled rings, to the left.

DETAILED DESCRIPTION OF UTILITY MODEL

Figure 1:
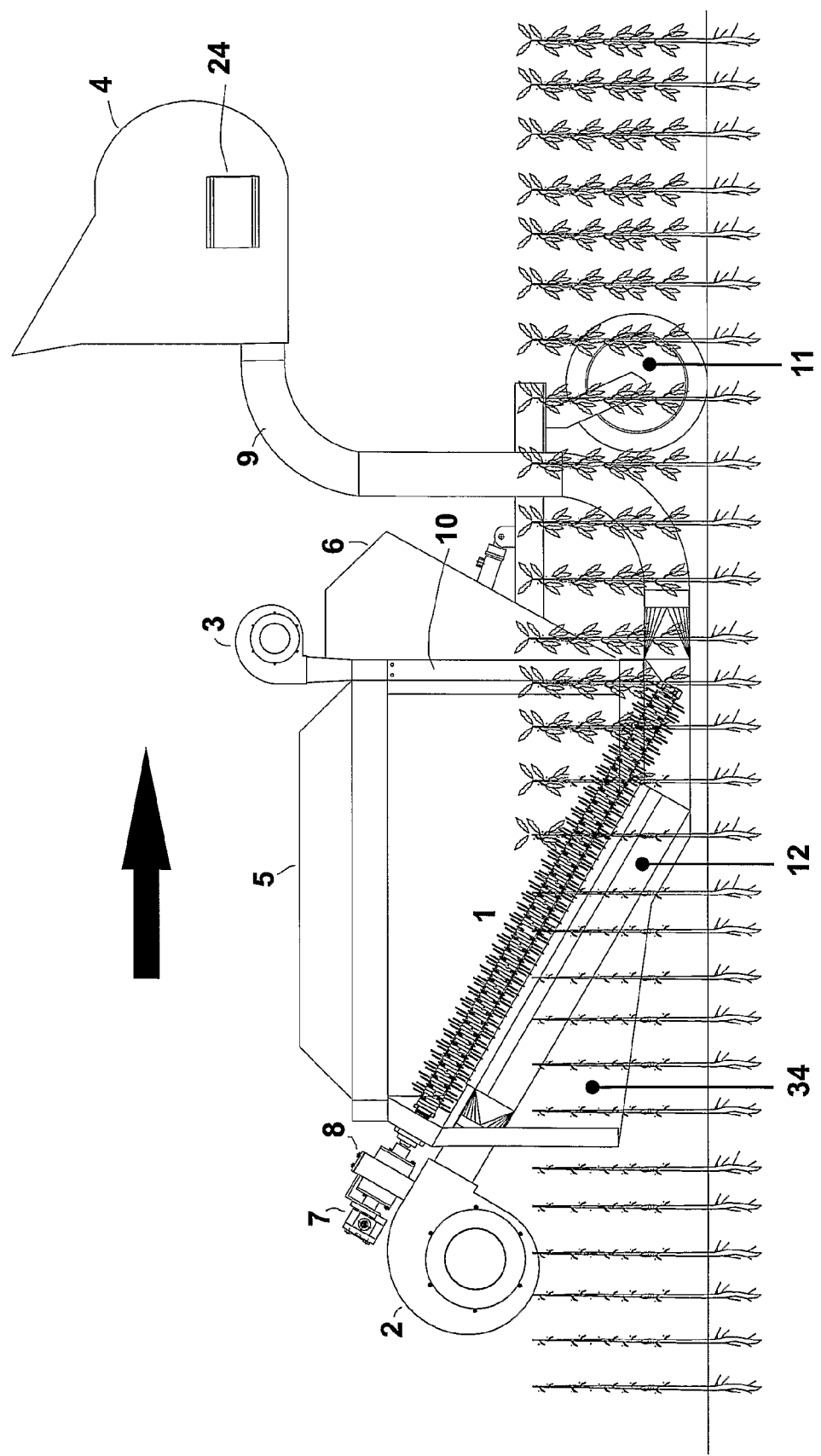
FIG. 1: Right lateral view of the grain harvester showing the new and improved angular position of the two rotating shafts with impact rods in harvesting position in relation to plant stalks, ascending spiral, in the direction of movement of the equipment (see arrow).
Figure 2:
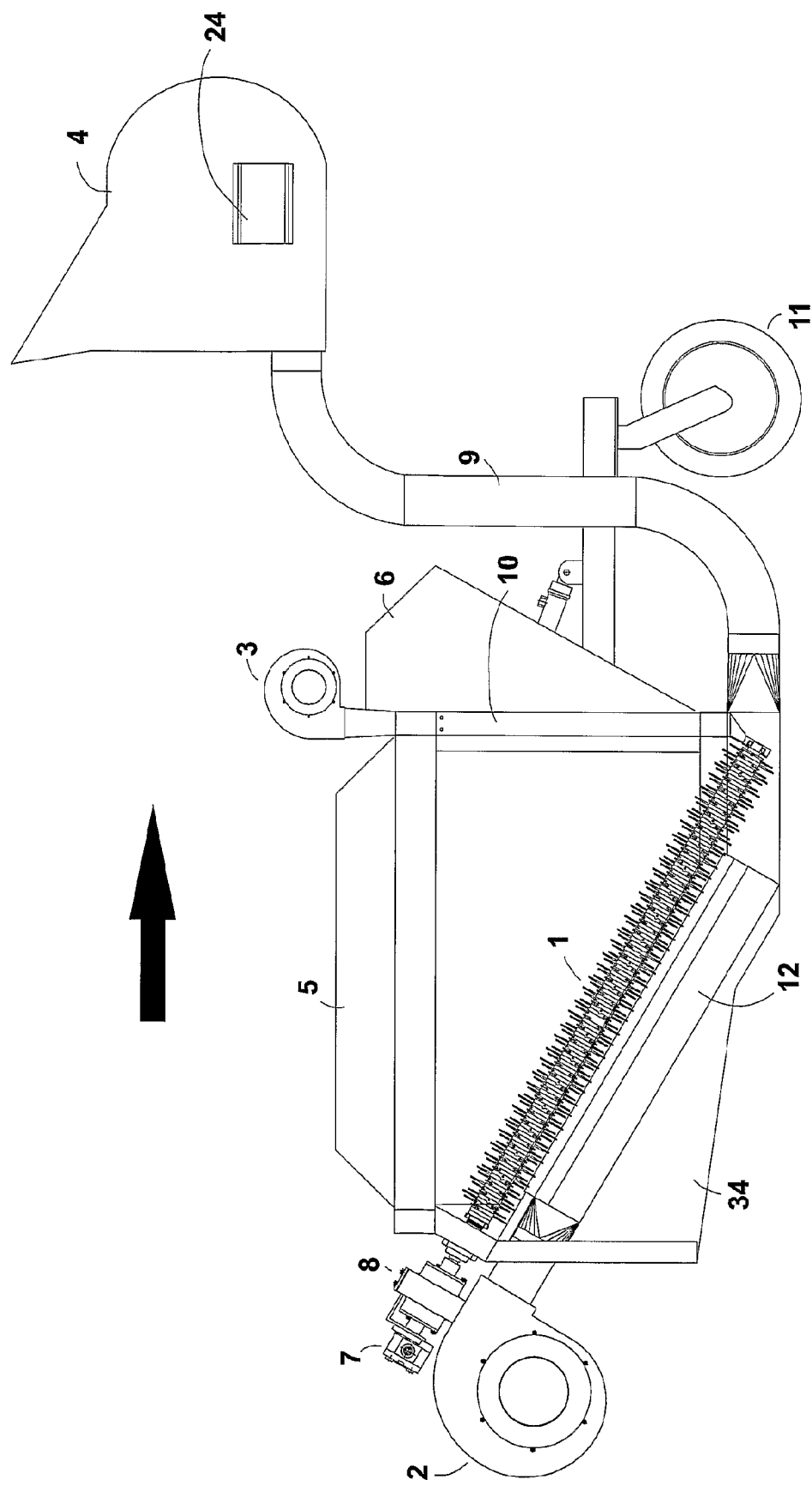
FIG. 2: Right lateral view of the grain harvester showing components.
Figure 3:
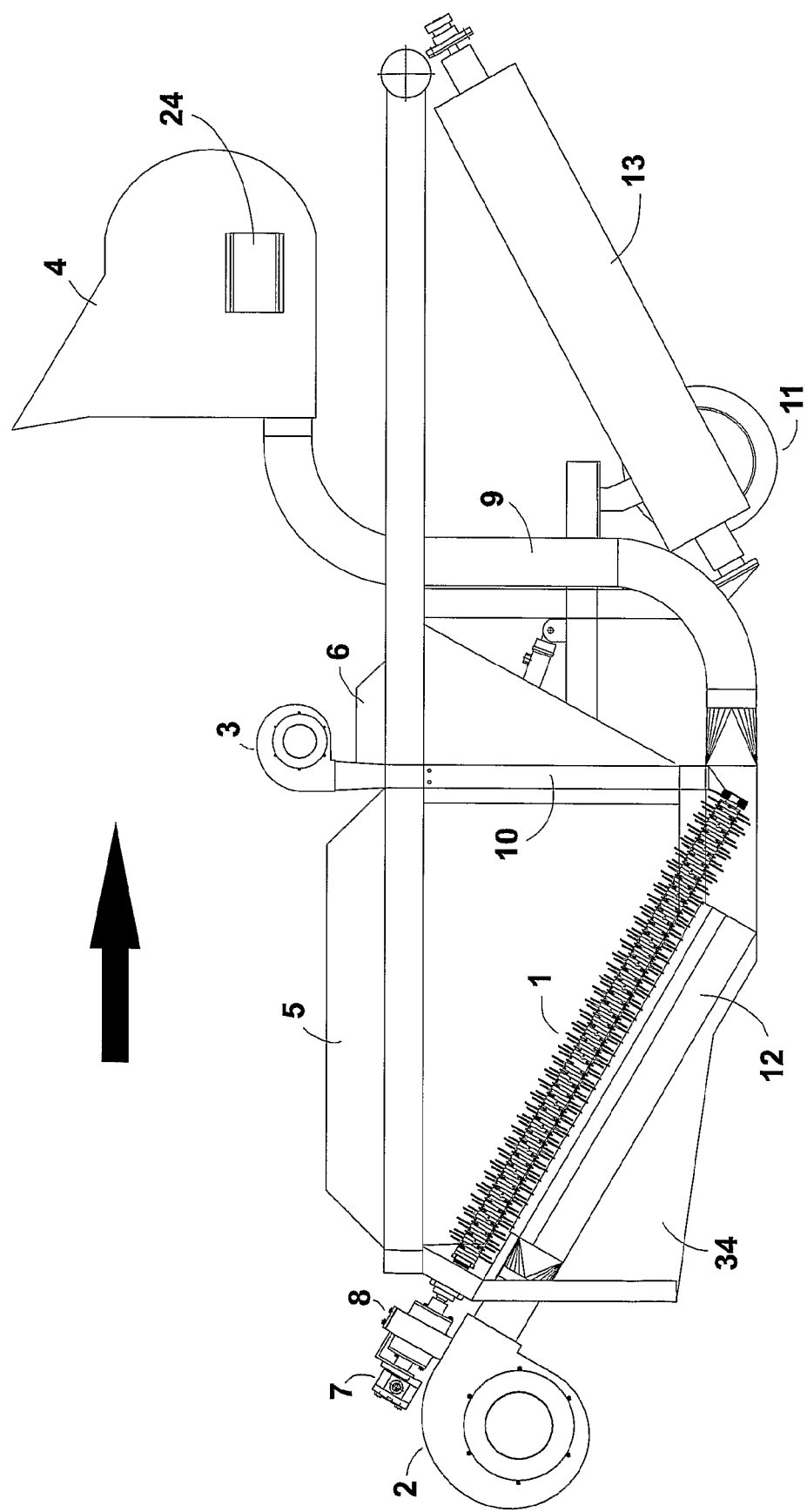
FIG. 3: Right lateral view of the pod harvester (namely, green soybean).
Figure 16:
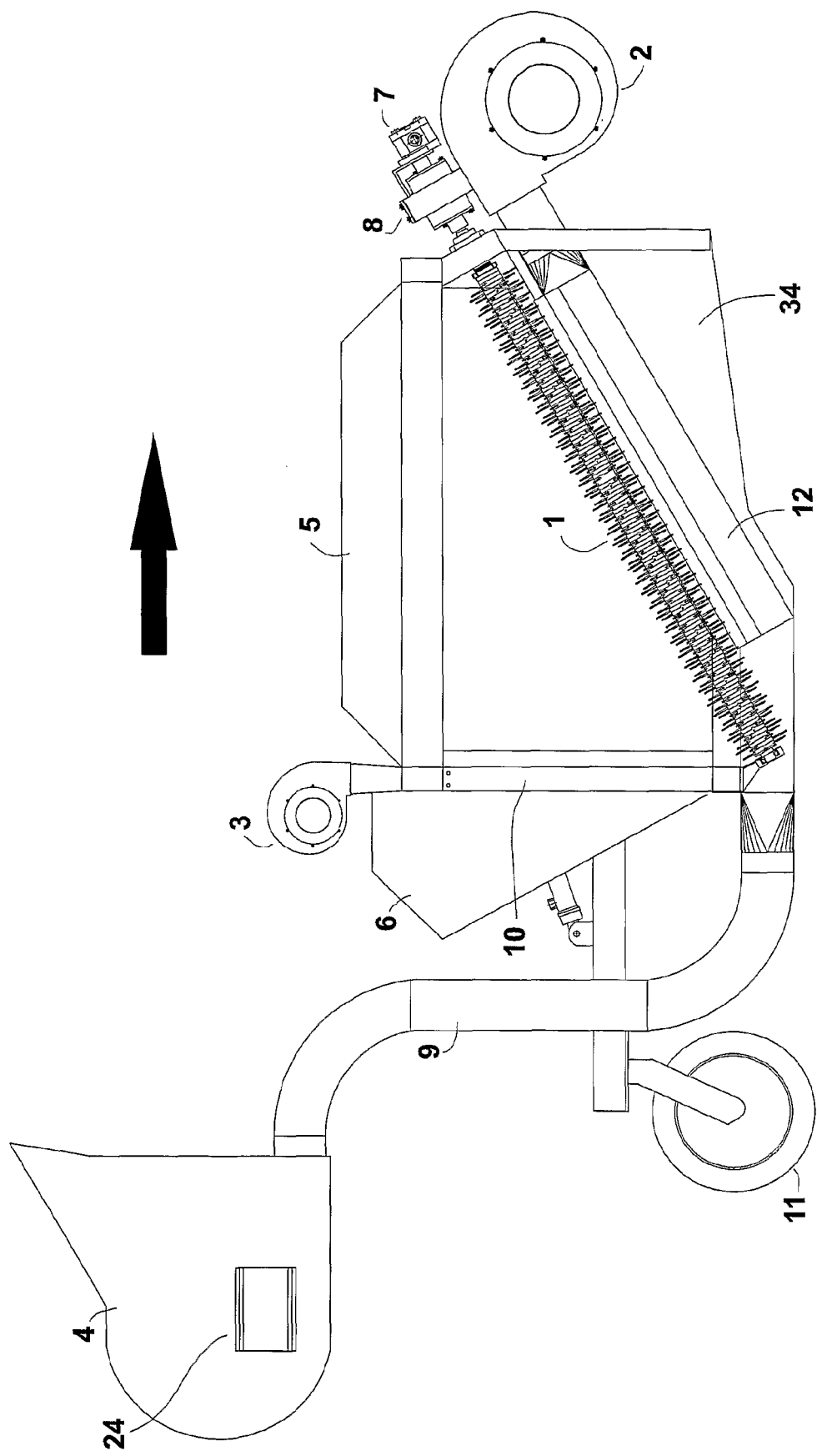
FIG. 16: Right lateral view of the rice and wheat (gramineous) grain harvester module showing the descendant spiral configuration, with the arrow indication the direction of movement

Altogether, a substantial group of improvements were incorporated, or, namely, new dispositions were introduced to the harvester system by twin rotating shafts mounted with impact rods and grain collection by pneumatic process. This assembly provides greater capacity and efficiency in the harvest of various types of grains, such as, for example, soybeans and beans (FIGS. 1 and 2), with said shafts mounted with rods in ascending spiral, as well as rice and wheat (FIG. 16), with shafts in descending spiral.

The part that comes into direct contact with the rows of plants in this harvesting process are the twin parallel rotating shafts mounted with impact rods (FIGS. 1, 2, 3, 12, 15 and 16, Item 1) disposed at an oblique angle in relation to the ground. The shafts are positioned in opposition to the plant rows. As they are rotated in opposite directions, when they strike the plants they are responsible for physically releasing the grains from, for example, panicles or pods. The grains are thrown upwards and subsequently collected by means of a process having blown air as main element. The original machine (BR MU7802681-4) in fact had the twin shafts disposed at an oblique angle in relation to the ground, but with the higher ends towards the harvester's direction of movement. The first advance, surprisingly, was that experimental results based on inverting the angle of the shafts, with the lower ends towards the harvester's direction of movement, proved to be a significant improvement in terms of harvest in ascending spiral. This advance was accorded the following denomination: Ascending Spiral Threshing Shafts (FIGS. 1, 2, 3, 11 and Item 1).

The Ascending Spiral Threshing Shafts form an angle of 30° in relation to a horizontal plane, with the lower extremity located at the forward end of the machine, in a manner that the semi-flexible cords (FIG. 4, Item 14) produce an ascending spiral when in movement. This assembly provides reduced grain loss during harvest, since the plants, when entering the machine, form a dynamic barrier that prevents the loss of culled grains.

Figure 4:
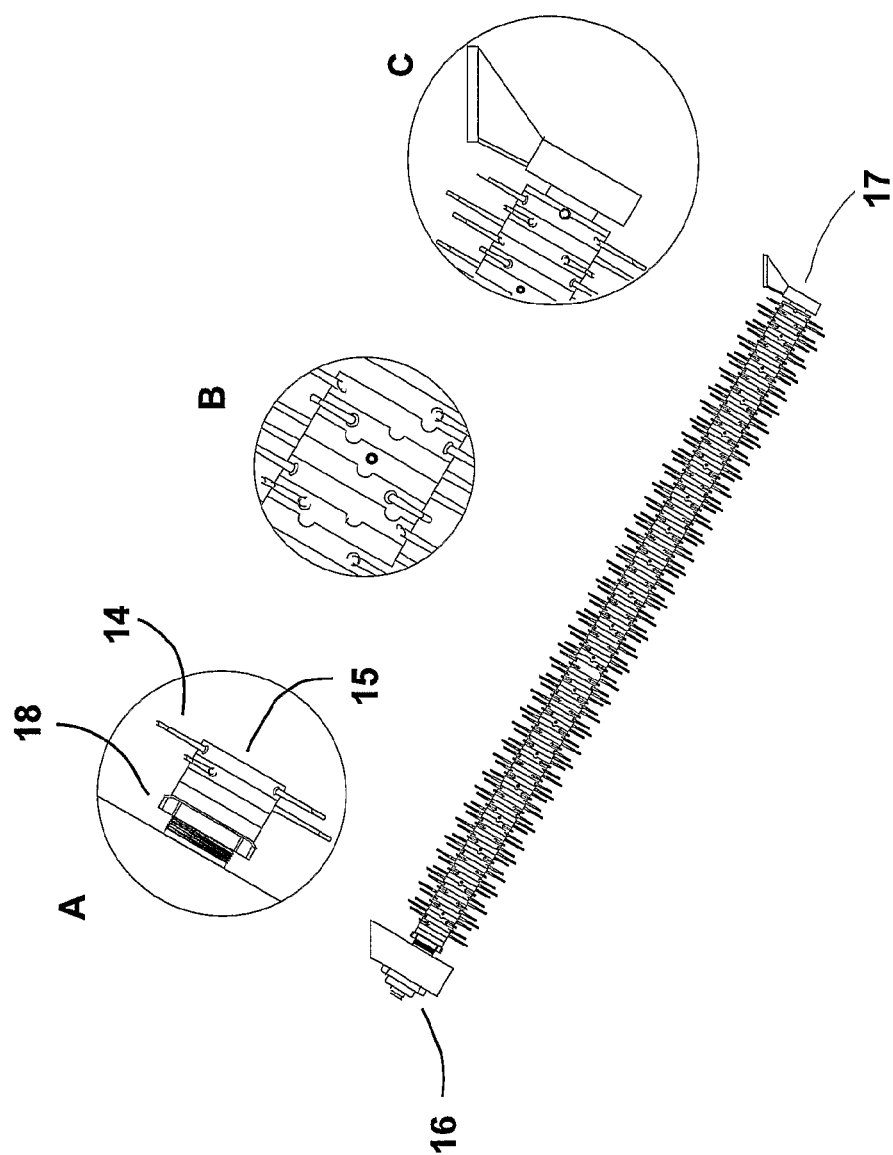
FIG. 4: Features a complete thresher shaft with details of its apical, intermediate and basal sections, respectively.
Figure 6:
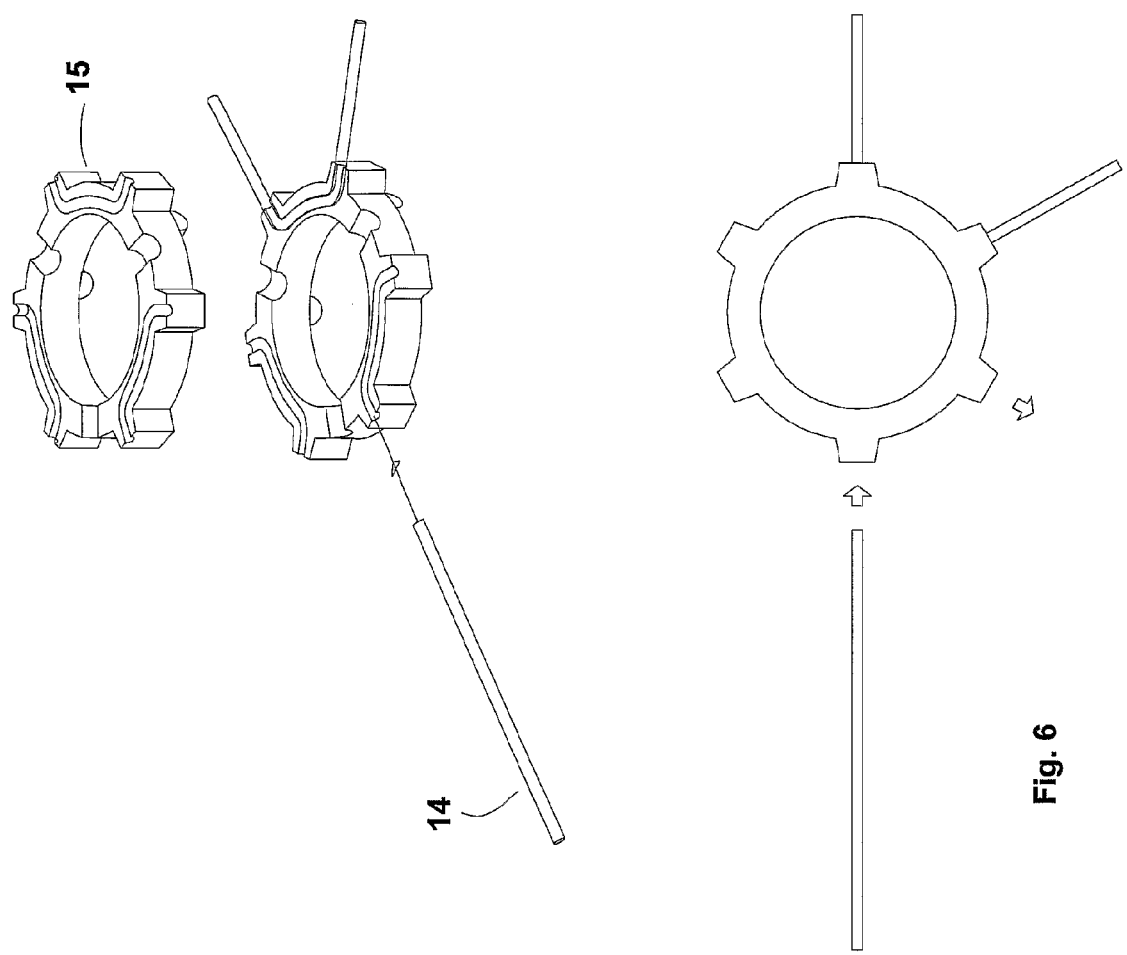
FIG. 6: Pair of rings, with perspective view of rod mounting, as well as an upper view.

A notable improvement was in relation the shape of each rotating shaft mounted with impact rods (1). The new shafts are designed for maximum efficiency, both in their capacity for releasing grains from the plants, as well as reducing grain loss. The original design (BR MU7802681-4) had a basic system, with shafts linked in spiral around a cylinder with fixing elements. Development has shown that the best system is a rotating shaft mounted with threshing rings (FIGS. 4-A and 5, Item 15), with six semi-flexible impact cords (FIGS. 4, 5 and 6, Item 14). Thus, the elements that thresh the pods are rings (15) disposed along the threshing shafts (1), each having six evenly spaced, semi-flexible cords arranged radially (14), forming an angle of 60° between them.

Furthermore, an advance was incorporated in relation the assembly system (FIGS. 4, 5 and 6) of the semi-flexible cords (14) to the rings (15). The cords (14) are introduced radially in recessions existing on one of the faces of the ring (15), in a manner that they are always held between two rings. The semi-flexible cords form a spiral configuration when mounted along the threshing shafts (1).

A new system intended to prevent the loss of grain (FIG. 7) was also developed. It comprises the forced passage of air generated by a blower (FIGS. 1, 2, 3, 7 and 16, item 3) being forced through vertical ducts (10) located in the forward part of the machine, with the air outlets (FIG. 7, Item 19) of the ducts directed to the lower part of the machine, near the grain collecting section, and thus preventing the loss of material already culled.

Figure 8:
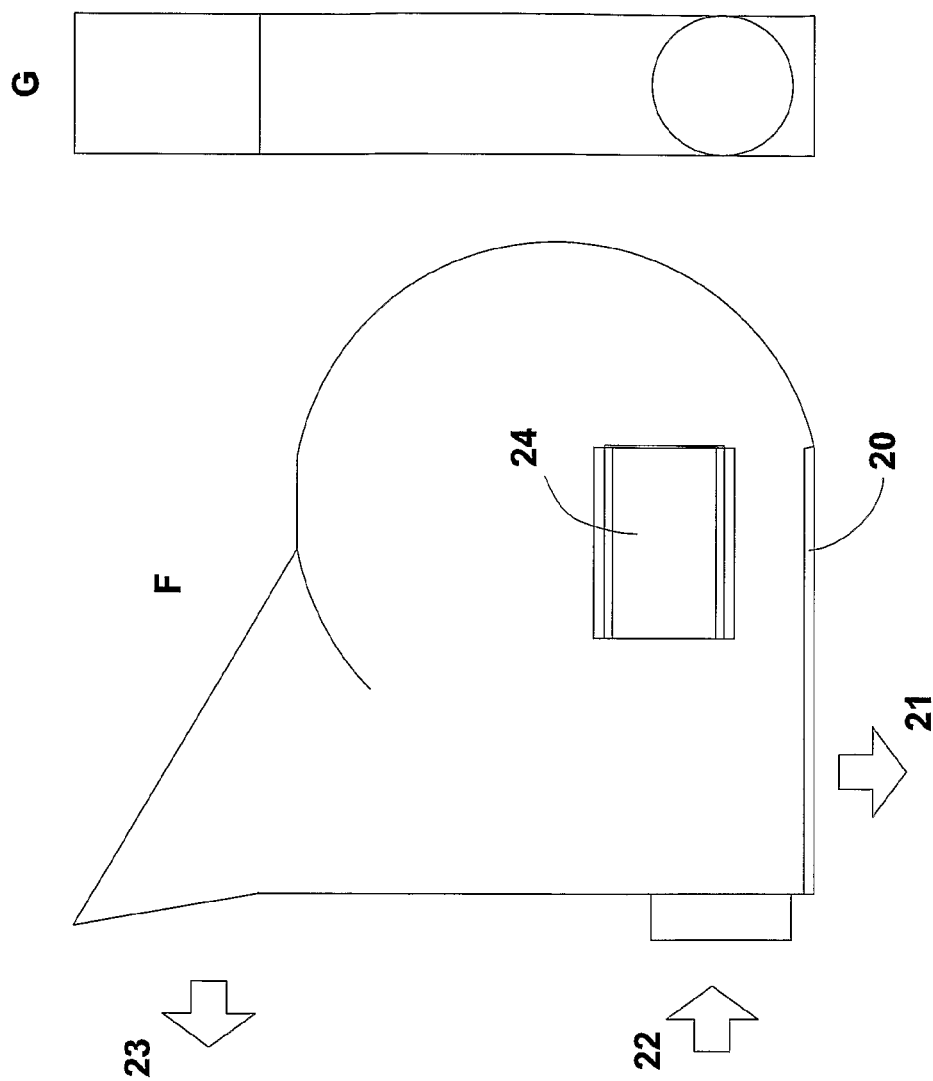
FIG. 8: Inertial chamber.
Figure 9:
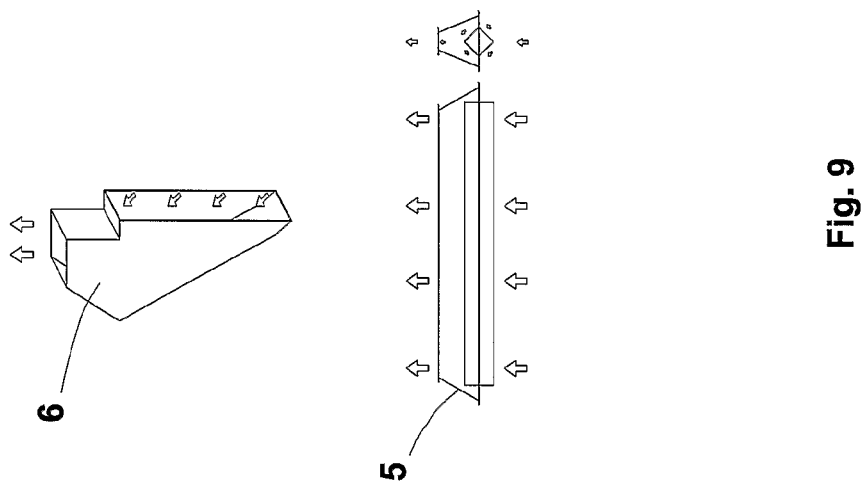
FIG. 9: Chaff Outlets.

Another element was incorporated that did not exist beforehand, namely the Inertial Chamber (FIGS. 1, 2, 3, 8 and 16, Item 4). This is responsible for the final separation of any remaining chaff. The design of this part reduces the speed of the grains (FIG. 8-F, right lateral view, FIG. 8-G, rear view) accumulated during pneumatic transport and consequently conveys the grain to the appropriate reservoir (FIG. 8-F, Item 21, grain outlet). The bottom of the part comprises a screen (FIG. 8-F, Item 20) to facilitate the separation of chaff.

Chaff Remover Nozzles (FIGS. 1, 2, 3, 9 and 16, Item 5, upper nozzle, Item 6, forward nozzle) were designed. These elements are mounted to the machine externally, one above (5) and one forward (6), with an appropriate design to only remove the chaff obtained from the threshing process, without any loss of culled grain.

Another advance was the lateral tractor hitching system (FIG. 10, Item 26), being hitched to the U shaped structure (25) on the tractor chassis. In this case, the non-propelled harvest system. For machines with up to three threshing modules (FIGS. 10 and 11, Item 27), the system allows lateral hitching to a regular farm tractor, by means of a structure adapted to its chassis (25) and couplings (26). This machine already includes one or more harvester modules. The system is modular for optimization according the number of rows, in a manner that each machine module corresponds to threshing a row of plants. The machine can be adapted to the number of required rows by bolting other modules side by side.

Furthermore, a self-propelled version (FIG. 11) for machines with more than three thresher modules, equipped with a self-propelled system for propulsion and driving the modules (27) arrayed under the chassis.

For certain cultures, a Plant Extractor was developed. For the harvest of bean crops, for example, it is located in the forward part of the machine, close to the row divider, and is a device for extracting the plant and retaining it in position for the threshing shaft. These comprise plowshare shaped metal sections sloping upwards into the machine, being mounted on the inner section of the row divider.

A Grain and Pod Separation System was developed for cultures with varying rates of pod ripeness. During the process of the bean harvest, certain pods are removed from the plant but not threshed since they have not attained the ideal humidity ratio for harvesting. These pods are separated from the threshed beans by means of screens placed below the inertial chamber (4), whereupon they are routed to another specific reservoir. This machine dispenses with the cutting and gathering of plants prior to subsequent threshing. With the extractor device and the thresher shaft (1) system the bean harvest is done in a single stage, which consists in a most relevant technological advance.

For rice and wheat cultures, a descendant thresher shaft system (FIG. 16), whereby the thresher shafts (1) may be placed in a manner that the semi-flexible cords produce a descending spiral when in movement, with their upper ends being close to the entry of the machine. In this case, a surrounding casing (FIG. 12, Item 28) is also installed to the lower end part of the shafts, between the air ducts (12), in a manner that allows threshed plants to slide past. The threshing operation only occurs to the upper part of the plant.

Alternatively, for soybean and bean cultures, an ascendant thresher shaft system (FIGS. 1, 2, 3 and 11), whereby the thresher shafts (1) are placed in a manner that they produce a ascending spiral when in movement, with their lower ends being close to the entry of the machine. Thus, a surrounding metal casing is installed around the shafts, at the entry of the machine, protecting the stalks of the plants from being struck by the semi-flexible rods. Threshing is also restricted to the upper part of the plant.

Finally, a defoliant roller (FIG. 3, Item 12) for the harvest of green soybeans was developed. In this manner, a defoliant roller is mounted in the forward part of the machine, with the purpose of stripping the green leaves remaining on the plant, before the action of the thresher shafts. The roller system (FIG. 13-M, right lateral view of the system, and FIG. 13-N, transverse section of the twin rollers illustrating the parallel alignment and bristles), comprises two sloped shafts, rotating in opposite directions, having flexible bristles installed radially. This includes a bearing wheel (32), upper bearing (30) and lower bearing (31).

Technical Characteristics of the New Components a) Thresher shafts (FIGS. 1, 2, 3, 4, 12, 15 and 16, Item 1) and (b) rings with bristles, as featured in FIGS. 5 and 6:

The thresher shafts (1) are responsible for the system of separating the grains from the plants.

Each thresher module (FIG. 10, Item 27) possesses two shafts, parallel to each other, sloped at 30° in relation to the ground, with one shaft turning clockwise, and the other anti-clockwise.

The lower end of each shaft (1) is located to the front of the machine.

This innovative disposal affords reduced grain loss during harvest, since the plants form a dynamic barrier when entering the machine, preventing the random loss of culled grains.

These shafts (1) are made of steel tubes, with both ends being solid, precisely at the point where the roller bearings and bearings (FIG. 4-C, FIG. 4, Item 16, Item 17, and also, as illustrated, the locking nut for the rings (15) in FIG. 4-A). Plastic rings (15) are mounted along each shaft (1) in a manner as to be in contact with the shaft surface.

Plastic rings (15) are mounted along each shaft (1) in a manner as to be in contact with the shaft surface.

This is possible because each ring (15) is locked by its former counterpart by a means of projections and grooves in its surface. One side of the ring (15) has semi-circular grooves and the other side has matching projections. In this manner, each ring is locked by its former counterpart. The first ring (15), located at the lower extremity of the shaft (1), is locked by means of a stud fixed to the shaft. At the upper extremity of the shaft there is a small threaded section, which allows tightening the last ring installed, by means of a nut (FIG. 4-A, Item 18).

In this manner, the rings (15) rotate in unison with the shafts (1).

These rings (15) mounted the length of each shaft (1) hold the elements responsible for the threshing effect, namely, the bristles (14).

The bristles (14) are flexible cords, preferentially of nylon, disposed radially in the rings (15), having six bristles to each ring (15), formed by three cords. The distribution of the bristles (14) around the circumference of the ring (15) is equidistant, forming an angle of 60° between each other. The six bristles (14) provide an optimum rate of threshing.

The mounting position of the rings (15) along the thresher shaft (1) is disposed so that the bristles (14) form an ascending spiral (FIGS. 1, 2, and 3), or, in other terms, create a direction of movement towards the inside of the machine.

c) Mounting of the bristles (14), according to FIGS. 5 and 6:

This element (14) is subject to wear with extended use and thus the design was modified enabling better maintenance and rapid substitution. The former model of nylon bristle was incorporated to the ring by means of injected plastic. The present new model aims to ease replacement of the bristle, as well as avoiding the need of changing the ring but only the bristle. Therefore, the bristle (14) is an independent element from the ring (15), The bristle actively operates in the threshing, striking the plants, and consists one of the extremities of the flexible nylon cord that has the precise length required to slot into the ring, besides from the length of each bristle.

Each ring (15) mounts three flexible cords, as illustrated in FIGS. 5 and 6, with each flexible cord corresponding to two bristles (14).

FIGS. 5 and 6 illustrate the mounting method, with each flexible cord being introduced radially into an opening in the side of the ring, passing through a semi-circular recession, and exiting the other side. Each ring (15) possesses three recessions on one of its sides.

The pressure of one ring (15) against another, by means of the tightening of the nut (FIG. 4-A, Item 18) located at one of the extremities of the thresher shaft produces sufficient pressure to maintain the flexible cords in position.

Figure 7:
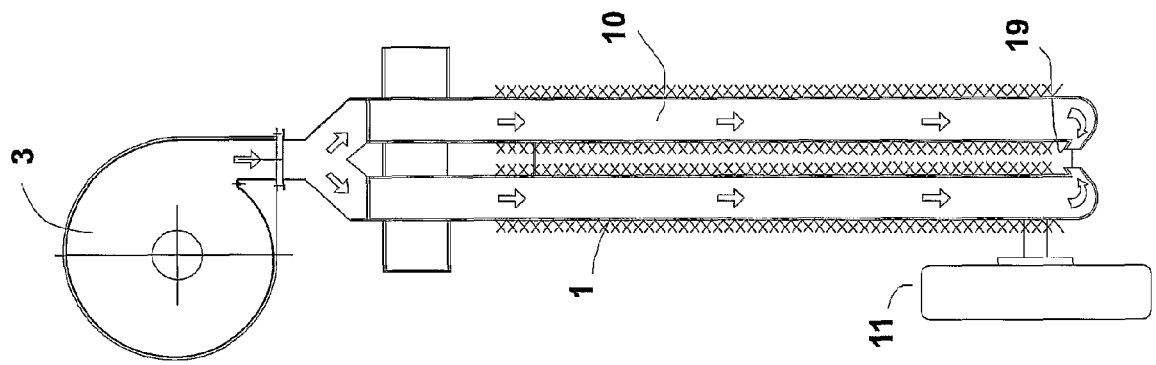
FIG. 7: Pneumatic system to prevent loss of grain.

In the case one or more cords require substitution, it is merely necessary to loosen the nut (18), and remove the cord. After positioning the new cord, the nut (18) at the extremity of the thresher shaft should be tightened again.

d) Pneumatic system for preventing loss of grains, as featured in FIG. 7:

Comprises the forced passage of air, generated by a blower (3) located in the upper part of the machine, through two vertical pipes (10) that are incorporated within the forward structure. The air is conveyed to the end of these pipes (10), as illustrated in the schematic drawing, and is directed so as to exit holes existing in these pipes (19).

This exit hole (19), in the shape of a nozzle, existing in each tube (10) directs the air to the interior of the machine, close to the grain collector and prevents the loss of culled material.

The flow of air that leaves each nozzle (19) is directed upwards and crosswise in relation to the opposite airflow.

e) Inertial chamber, as featured in FIG. 8:

Element (FIG. 8-F, right lateral view, and FIG. 8-G, rear view) responsible for the final separation of remaining chaff in the mass of collected grains. The design of this part reduces the speed of the grains (FIG. 8-F, right lateral view, FIG. 8-G, rear view) accumulated during pneumatic transport and consequently delivers the grain to the appropriate reservoir.

This element (FIGS. 1, 2, 3 and 16, Item 4, as well as FIG. 8-F) is installed at the end of the pneumatic transport duct (9) and immediately above the grain reservoir. As illustrated in FIG. 8, the air together with the mass of grains and some chaff enter the inertial chamber by the existing hopper (22), is conveyed through a spiral duct, and the grains, on losing speed, fall to a screen (20) existing at the bottom of the part. The air and light chaff are expelled through the outlet (23) located in the upper part of the chamber.

Figure 10:
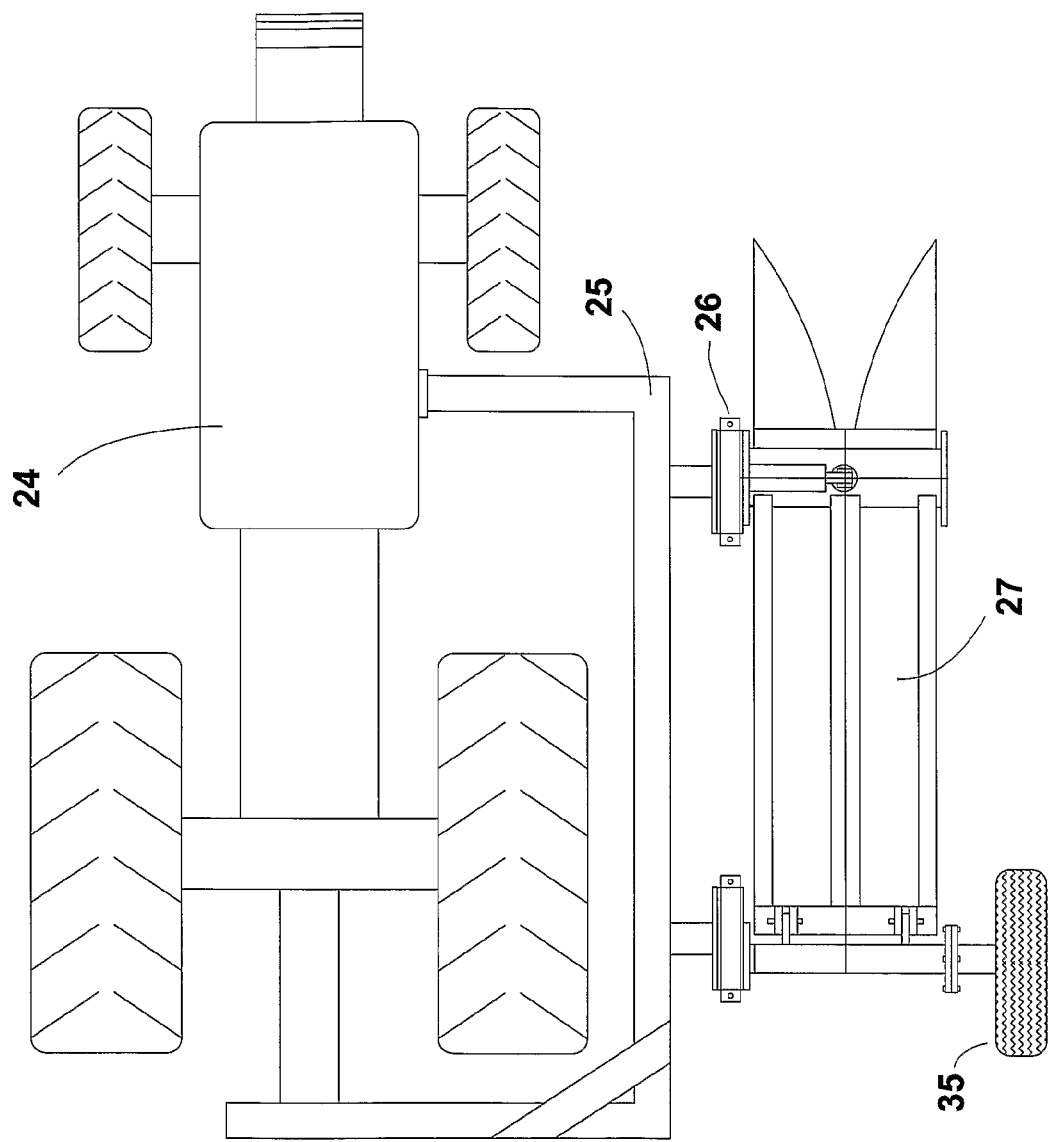
FIG. 10: Lateral tractor hitch.

An inspection window is located in the side (24) for visual verification and cleaning.

g) Lateral tractor hitch, as featured in FIG. 10:

For harvester machines with up to three thresher modules, it is possible to hitch the said threshers to the side of a regular farm tractor, by means of a structure made of a metal frame adapted to their chassis (25) and couplings (26).

The hitch of the machine to the structure is not rigid, but rather articulated so as to follow the ground contours.

The machine possesses two articulated hitching points to the structure (25) of the tractor (24), one forward and another to the rear (26). The articulation (26) at these points is by means of a system of hinges, with metal pins and bushings.

At the forward articulation point (26), a vertically mounted hydraulic cylinder has one end fixed to a metal bar connected to the articulation point on the structure. The other end of the said cylinder is fixed to the thresher module. This hydraulic cylinder, which is actuated by the tractor power, allows adjustment of the thresher module height, so as to allow road transport.

Hitching and unhitching the thresher module to the structure of the chassis is simply done by inserting or removing the pins from inside the bushings at the two articulation points.

A bearing wheel (35) is located to the rear of the machine, on the opposite side of the tractor, to support the assembly on the ground.

Figure 11:
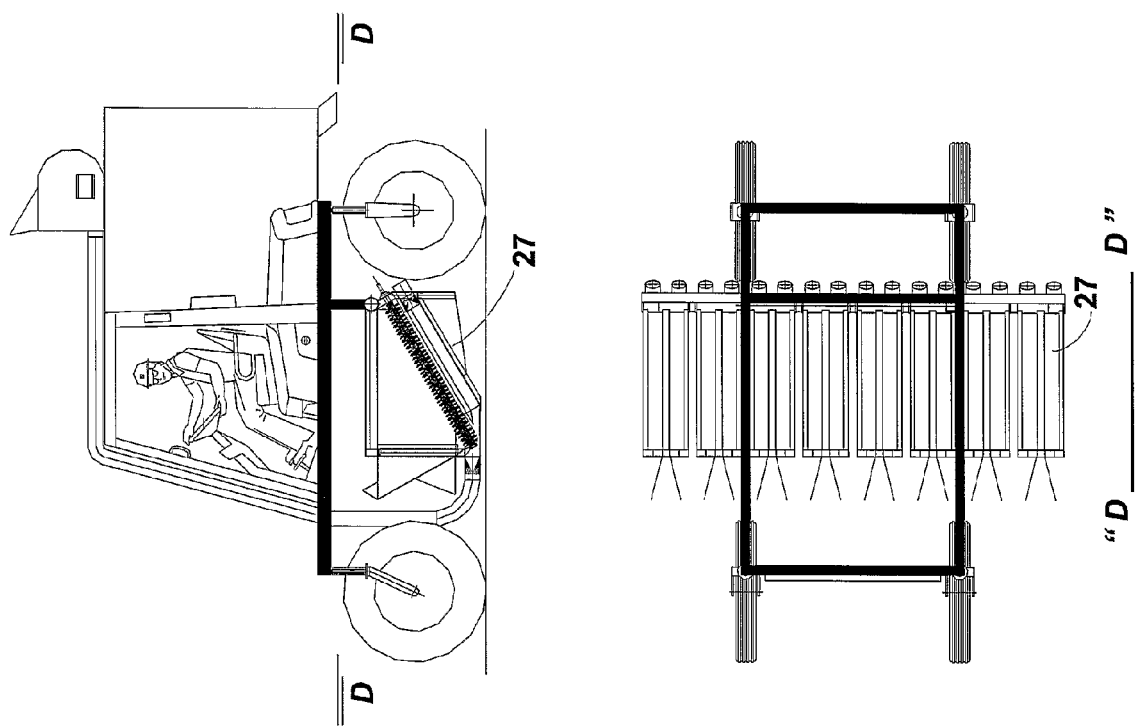
FIG. 11: Self-propelled system.
Figure 12:
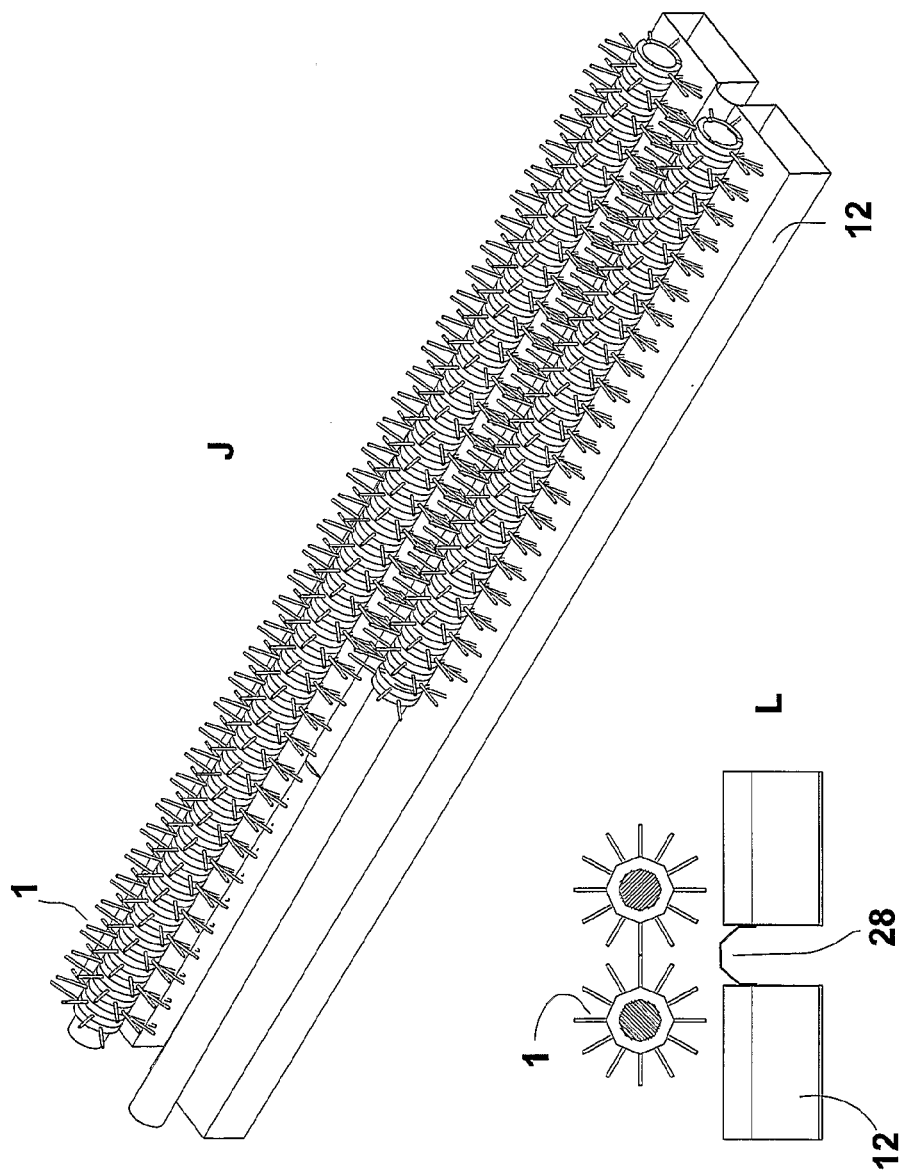
FIG. 12: Surrounding casing.

The thresher modules are linked to each other by means of flanges and bolts.

h) Self-propelled system:

A self-propelled system was developed for machines with more than three thresher modules, providing propulsion and with the modules (27) arrayed under the chassis, as featured in FIG. 11.

i) Surrounding casing, as featured in FIG. 12:

For the harvest of rice and grain crops, the thresher shafts should be mounted in a manner that the bristles produce a descending spiral when rotated, with the upper extremity close to the entry of the machine.

Furthermore, it is necessary to install a semi-circular metal casing (28) around the latter half of the thresher shafts (1), linking the two air ducts, as illustrated in FIG. 12.

This surrounding plate (28) has the purpose of preventing the contact of threshed plant stalks with the shafts (1).

Figure 13:
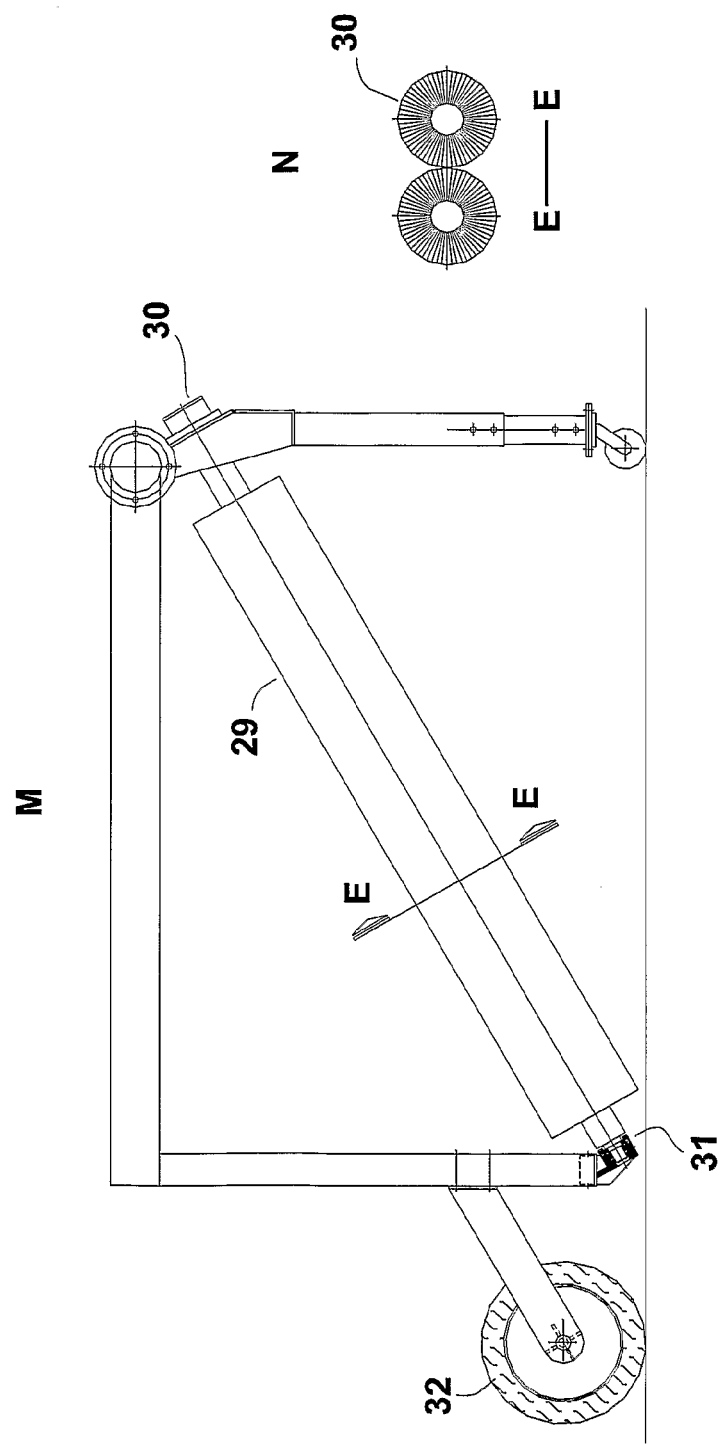
FIG. 13: Defoliant roller.

Threshing is restricted to the upper part of the plant.

j) Defoliant roller, as featured in FIG. 13:

The harvest of green soybeans requires an operation prior to threshing which consists in stripping the green leaves from the plants, before harvesting the pods.

As such, a defoliant was developed, comprising two sloped rollers (29), rotating in opposite directions. Each roller (29) is composed of a shaft to which flexible bristles are radially fixed (30).

Figure 14:
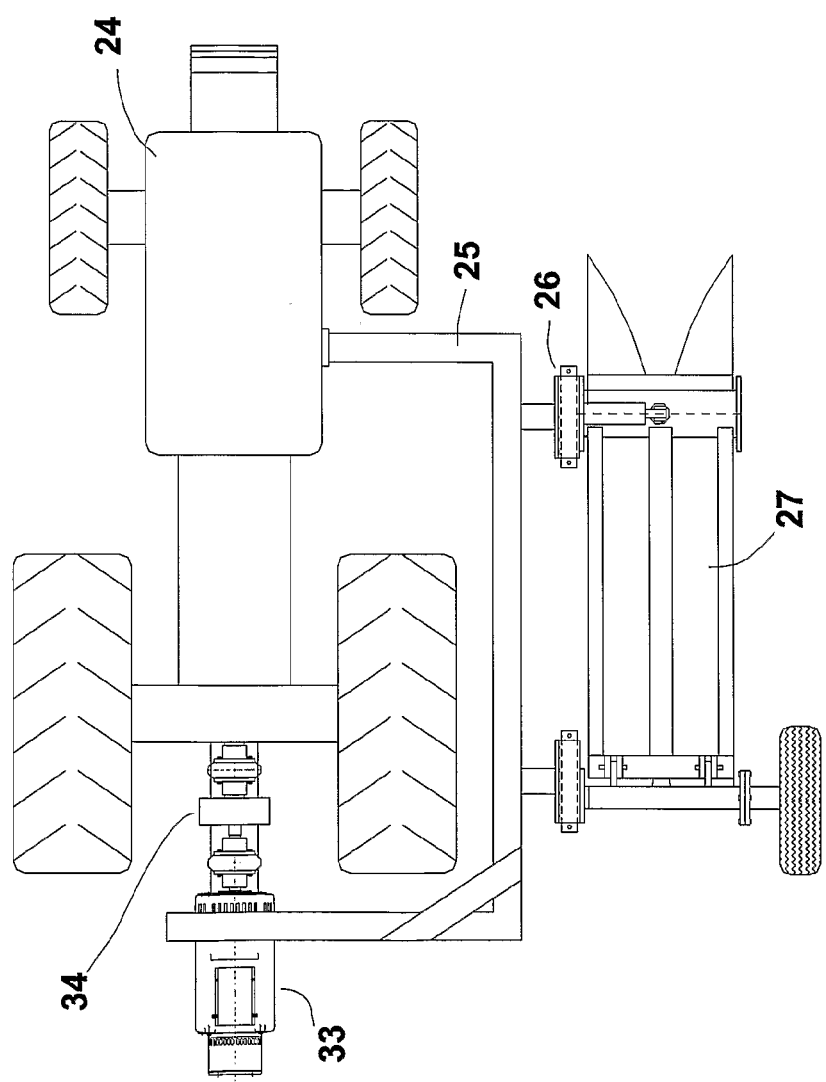
FIG. 14: Electric generator.

The said rollers (29) are mounted to a structure made of metal frames and rest on roller bearings and bearings (30 and 31). The assembly is towed by a tractor and the power for rotating the shafts is transmitted from the tractor's power take-off.

k) Electric generator, as featured in FIG. 14:

There are three moving mechanisms to each thresher module, namely, a blower to generate air for the pneumatic system for preventing the loss of grains (FIGS. 1, 2, 3, 7 and 16, Item 3), a blower for generating the air for cleaning and transporting the mass of grains (FIGS. 1, 2, 3, 15 and 16, Item 2) and the twin thresher shafts (1).

Each of these moving components was fitted with an electric motor (FIGS. 1, 2, 3, 15 and 16, Item 7, whereby Item 8 includes a reduction box) to provide the necessary power. The electrical power to drive these motors (7) is obtained from an electric generator (33) installed at the tractor's power take-off, by means of a gear box (34).

Figure 15:
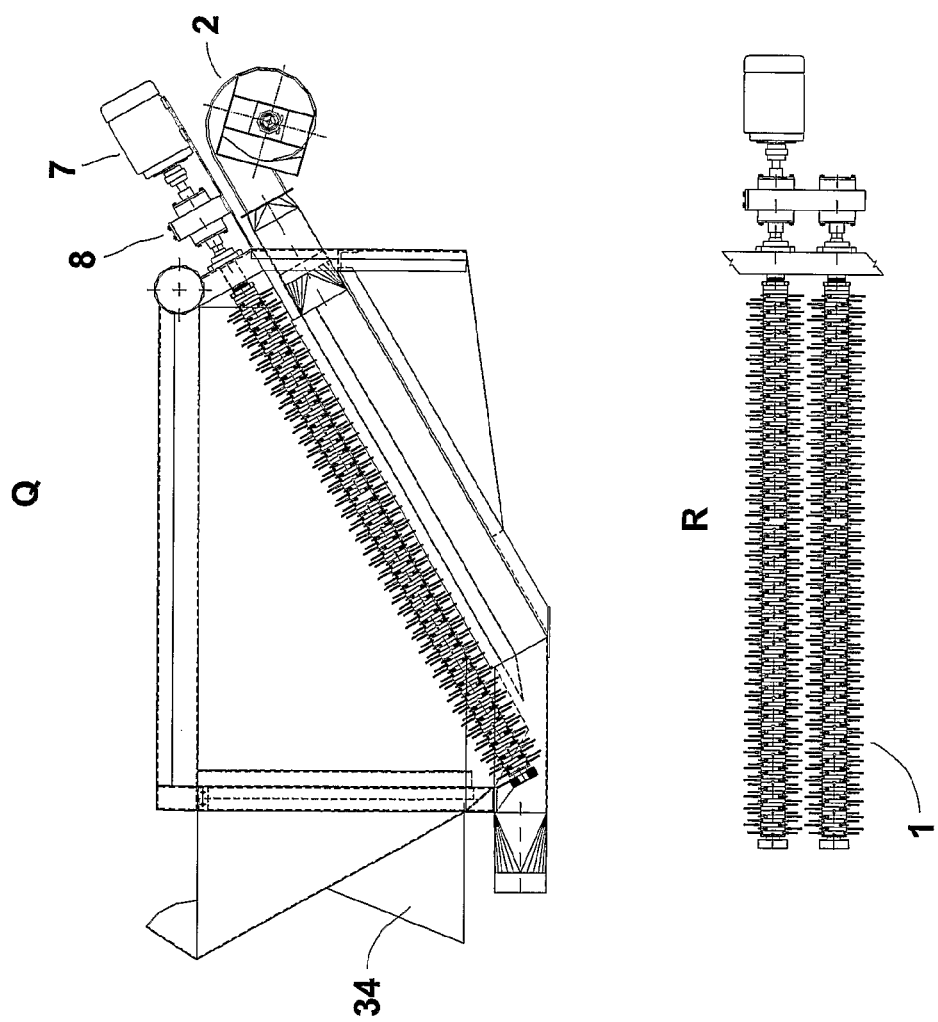
FIG. 15: Thresher shaft drive system.

A gear box (34) was fitted between the tractor's power take-off and the generator with the purpose of raising the tractor's shaft rotation to the working rotation required by the generator (33).

l) Thresher shaft drive systems, as featured in FIG. 15:

There are two thresher shafts (1) to each machine module (27), with each rotating in opposite directions. To achieve this purpose with the present new model, the existing belt and pulley drive of the former model was replaced by a gear box (8).

This gear box (8) is coupled to the ends of the two shafts (1) and transmits the rotating movement simultaneously, but in opposite directions however. The drive and necessary power are provided by an electric motor (7) installed at the opposite end of the coupling to the shafts (1).

A frequency inverter is incorporated to the drive system of these shafts (1), with the purpose of activating the electric motor (7), increasing or reducing the working rotations. This feature is important, because the amount of rotations required must be altered according to the type of grain to be harvested and the humidity ratio of the plants.

The invention claimed is:

1. A harvesting module comprising:
   i) twin parallel rotating shafts, each shaft having impact rods configured to rotate in opposite directions in ascending spiral;
   ii) each of the shafts having a plurality of rings disposed along the shaft to fix the impact rods to the shaft; and
   iii) said shafts sloped in a way that ends on one side of the twin parallel rotating shafts are closer to the ground than opposite ends of the twin parallel rotating shafts,
   wherein the impact rods are fixed to the plurality of rings by being pressed by adjacent rings of the plurality of rings;
   wherein the twin parallel rotating shafts each comprises:
   an internal cylinder;
   the rings turning in unison with the internal cylinder;
   an independent semi-flexible cords fitted to the rings and forming the impact rods; and
   the internal cylinder having an easily removed end fitting in order to release contact pressure of the adjacent rings and to remove the independent cords;
   wherein each of the rings comprises:
   semicircular recessions to fit the impact rods to the sides of the said ring;
   and
   projections and second recessions mating one ring to another and preventing separate rotation;
   and
   the independent and insertable cords, each one fitted to a semicircular recession and forming a pair of the impact rods.

2. The harvesting module (27) according to claim 1, wherein the rotation of the twin shafts (1) are driven by an electric motor (7).

3. The harvesting module according to claim 1, having a power source provided by an electric generator (33) coupled to a regular farm tractor's power take-off (PTO) shaft.

4. The harvesting module according to claim 1, wherein forward ends of the twin parallel rotating shafts are configured to be lower to the ground than rearmost ends, in a travel direction.

5. The harvesting module according to claim 1, further comprising:
   a grain transport and cleaning system comprising a blower and an air duct located under the plane of the shafts, a duct for conveying grains and chaff, and an inertial chamber.

6. The harvesting module according to claim 1, further comprising:

a pneumatic system preventing loss of grains with applying an airflow at the ends of the twin parallel rotating shafts closer to the ground.

7. The harvesting module according to claim 4, further comprising:
a pneumatic system preventing loss of grains by applying an airflow at the ends of the twin parallel rotating shafts closer to the ground.

8. The harvesting module according to claim 1, further comprising:
a defoliant system mounted in front of the harvesting module.

9. A harvesting module comprising:
i. twin parallel rotating shafts, each shaft having impact rods configured to rotate in opposite directions in ascending spiral;
ii. each of the shafts having a plurality of rings disposed along the shaft to fix the impact rods to the shaft; and
iii. said shafts sloped in a way that ends on one side of the twin parallel rotating shafts are closer to the ground than opposite ends of the twin parallel rotating shafts,
wherein the impact rods are fitted to each ring and kept in place by being pressed by adjacent rings of the plurality of rings;
wherein the twin parallel rotating shafts each comprises:
an internal cylinder;
the rings turning in unison with the internal cylinder;
an independent semi-flexible cords fitted to the rings and forming the impact rods; and
said internal cylinder having an easily removed end fitting in order to release contact pressure of the adjacent the rings and to remove the independent cords;
wherein each of the rings comprises:
semicircular recessions to fit the impact rods to the sides of the said ring;
and
projections and second recessions mating one ring to another and preventing separate rotation;
and
the independent and insertable cords, each one fitted to a semicircular recession and forming a pair of the impact rods.

* * * * *